US012705766B2

(12) United States Patent
Ebata

(10) Patent No.: US 12,705,766 B2
(45) Date of Patent: Aug. 11, 2026

(54) IMAGE PROCESSING APPARATUS, SYSTEM, IMAGE PROCESSING METHOD, AND IMAGE PROCESSING PROGRAM

(71) Applicant: FUJIFILM Corporation, Tokyo (JP)

(72) Inventor: Tetsurou Ebata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 230 days.

(21) Appl. No.: 18/470,100

(22) Filed: Sep. 19, 2023

(65) Prior Publication Data

US 2024/0112357 A1 Apr. 4, 2024

(30) Foreign Application Priority Data

Sep. 29, 2022 (JP) ................................ 2022-157094

(51) Int. Cl.
*G06T 7/33* (2017.01)
*G06T 7/50* (2017.01)
(Continued)

(52) U.S. Cl.
CPC .................. *G06T 7/33* (2017.01); *G06T 7/50* (2017.01); *G06T 7/73* (2017.01); *G06T 7/90* (2017.01);
(Continued)

(58) Field of Classification Search
CPC . G06T 2207/10132; G06T 2207/30101; G06T 7/33; G06T 7/50; G06T 7/73;
(Continued)

(56) References Cited

U.S. PATENT DOCUMENTS

2006/0085049 A1* 4/2006 Cory .................... A61B 5/4041 607/48
2012/0071757 A1 3/2012 Salcudean et al.
(Continued)

FOREIGN PATENT DOCUMENTS

JP 2015-085013 A 5/2015
JP 2019-097861 A 6/2019
(Continued)

OTHER PUBLICATIONS

The extended European search report issued by the European Patent Office on Jan. 11, 2024, which corresponds to European Patent Application No. 23200238.6-1126 and is related to U.S. Appl. No. 18/470,100.
(Continued)

*Primary Examiner* — Ming Y Hon
*Assistant Examiner* — Amanda H Pearson
(74) *Attorney, Agent, or Firm* — Studebaker Brackett PLLC

(57) ABSTRACT

The image processing apparatus acquires an optical camera image and an ultrasound image captured in a state where a plurality of markers that have a first feature identifiable by the optical camera image and a second feature identifiable by the ultrasound image and that are distinguishable from other markers based on the first feature and the second feature are provided on the subject, detects a region of interest from the ultrasound image, detects a first marker image from the optical camera image, detects a second marker image from the ultrasound image, and performs registration between the optical camera image and the ultrasound image based on the first feature of the first marker image and the second feature of the second marker image and displays an image representing the region of interest superimposed on the optical camera image.

9 Claims, 10 Drawing Sheets

(51) Int. Cl.
*G06T 7/73* (2017.01)
*G06T 7/90* (2017.01)
*G06V 10/25* (2022.01)

(52) U.S. Cl.
CPC .... *G06V 10/25* (2022.01); *G06T 2207/10024* (2013.01); *G06T 2207/10132* (2013.01); *G06T 2207/20221* (2013.01); *G06T 2207/30101* (2013.01); *G06T 2207/30208* (2013.01); *G06T 2207/30244* (2013.01); *G06V 2201/03* (2022.01)

(58) Field of Classification Search
CPC ............. G06T 7/90; G06T 2207/10024; G06T 2207/20221; G06T 2207/30208; G06T 2207/30244; G06V 2201/03; G06V 10/25; A61B 5/0035; A61B 5/489; A61B 8/5261; A61B 8/4416; A61B 8/0891; A61B 5/0077
See application file for complete search history.

(56) References Cited

U.S. PATENT DOCUMENTS

| | | | | |
|---|---|---|---|---|
| 2015/0119684 | A1 | 4/2015 | Furukawa et al. | |
| 2016/0228090 | A1 | 8/2016 | Boctor et al. | |
| 2019/0183347 | A1 | 6/2019 | Hirata | |
| 2020/0138413 | A1 | 5/2020 | Okano et al. | |
| 2020/0138518 | A1* | 5/2020 | Lang | A61B 17/1703 |
| 2020/0294276 | A1 | 9/2020 | Hirata | |
| 2021/0145608 | A1* | 5/2021 | Herr | A61B 5/004 |
| 2022/0011270 | A1* | 1/2022 | Arvanitis | G01N 29/348 |
| 2022/0257212 | A1* | 8/2022 | Marcus | A61B 8/4245 |

FOREIGN PATENT DOCUMENTS

| | | |
|---|---|---|
| JP | 2019-107421 A | 7/2019 |
| JP | 2020-069312 A | 5/2020 |

OTHER PUBLICATIONS

Chenxi Huang et al., "A New Framework for the Integrative Analytics of Intravascular Ultrasound and Optical Coherence Tomography Images", IEEE Access, vol. 6, May 22, 2018, pp. 36408-36419, XP093115171, USA, ISSN: 2169-3536, DOI: 10.1109/ACCESS.2018.2839694, Internet:URL:https://core.ac.uk/download/pdf/161818348.pdf.

"Notice of Reasons for Refusal" Office Action issued in JP 2022-157094; mailed by the Japanese Patent Office on Apr. 21, 2026.

* cited by examiner

FIG. 4
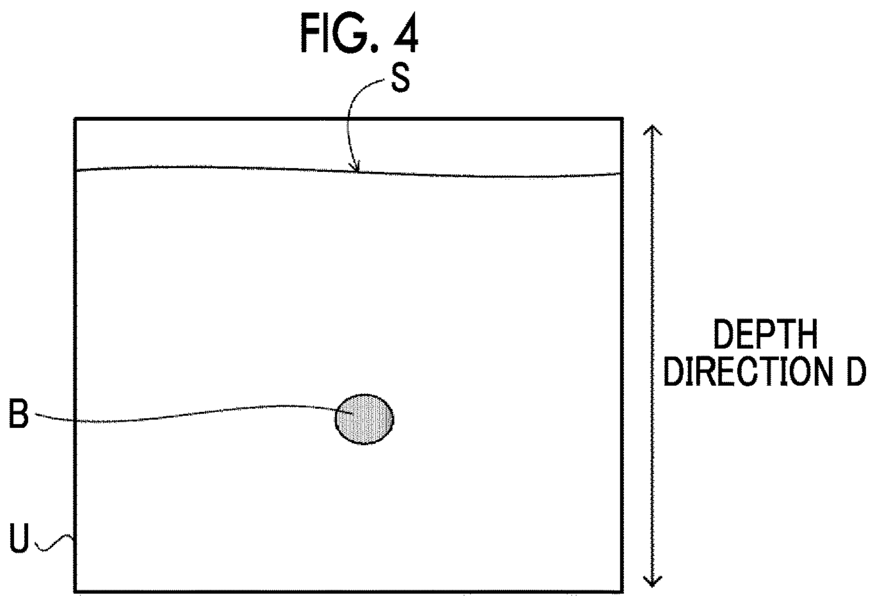
FIG. 5
70A 70B 70C 70D 70A
16
W
72
FIG. 6A
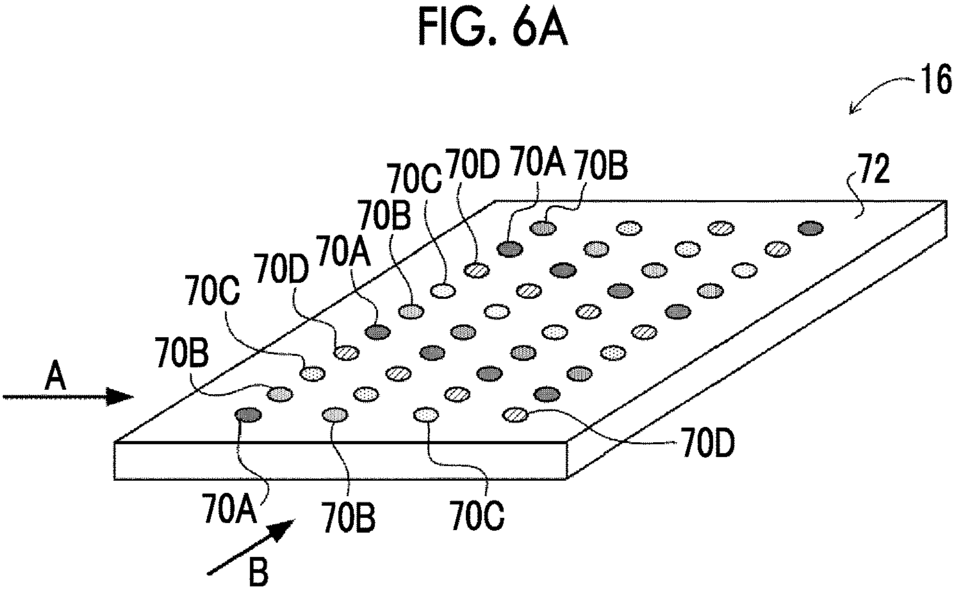

| | | FIRST FEATURE (COLOR) | | | |
|---|---|---|---|---|---|
| | | RED | GREEN | BLUE | PURPLE |
| SECOND FEATURE (DEPTH) | 5 mm | MARKER A | | | |
| | 10 mm | | MARKER B | | |
| | 15 mm | | | MARKER C | |
| | 20 mm | | | | MARKER D |

38

START
DISPOSE MARKER GROUP
S10
CAPTURE OPTICAL CAMERA IMAGE
S12
CAPTURE ULTRASOUND IMAGE
S14
PERFORM IMAGE PROCESSING
S16
END 16
70D
10
L
M
N
70A
W
70B
70C
SCANNING
DIRECTION
72

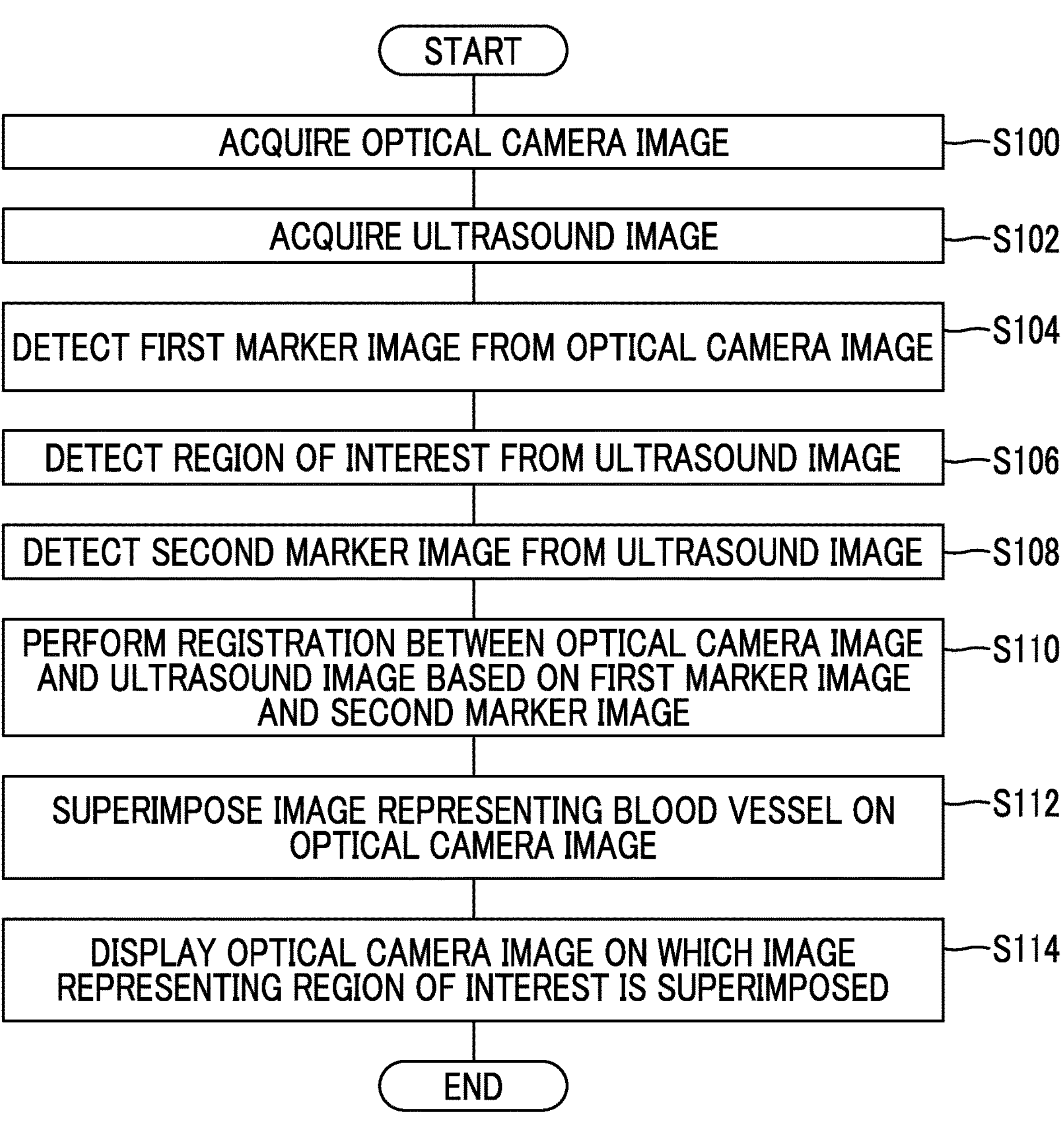
FIG. 13
START
ACQUIRE OPTICAL CAMERA IMAGE
S100
ACQUIRE ULTRASOUND IMAGE
S102
DETECT FIRST MARKER IMAGE FROM OPTICAL CAMERA IMAGE
S104
DETECT REGION OF INTEREST FROM ULTRASOUND IMAGE
S106
DETECT SECOND MARKER IMAGE FROM ULTRASOUND IMAGE
S108
PERFORM REGISTRATION BETWEEN OPTICAL CAMERA IMAGE AND ULTRASOUND IMAGE BASED ON FIRST MARKER IMAGE AND SECOND MARKER IMAGE
S110
SUPERIMPOSE IMAGE REPRESENTING BLOOD VESSEL ON OPTICAL CAMERA IMAGE
S112
DISPLAY OPTICAL CAMERA IMAGE ON WHICH IMAGE REPRESENTING REGION OF INTEREST IS SUPERIMPOSED
S114
END

P
75A
75B
75C
75D
75A
L
M
N
76A
76B
76C
B
U

IMAGE PROCESSING APPARATUS, SYSTEM, IMAGE PROCESSING METHOD, AND IMAGE PROCESSING PROGRAM

CROSS-REFERENCE TO RELATED APPLICATIONS

This application is based on and claims priority under 35 USC 119 from Japanese Patent Application No. 2022-157094, filed Sep. 29, 2022, the disclosure of which is incorporated herein by reference in their entirety.

TECHNICAL FIELD

The present disclosure relates to an image processing apparatus, a system, an image processing method, and an image processing program.

RELATED ART

An ultrasonography apparatus that captures an ultrasound image of a subject by using an ultrasound probe that receives an ultrasound echo of an ultrasonic wave transmitted to the subject and outputs a reception signal based on the received ultrasound echo is known. In addition, in capturing an ultrasound image, a technique of acquiring an optical camera image by imaging a surface of the subject with an optical camera is known.

As a technique of capturing an ultrasound image and an optical camera image on the same subject, for example, a technique disclosed in JP2019-097861A is known. In the technique disclosed in JP2019-097861A, a technique is disclosed in which a probe is placed at a specific position on a body of the subject, a positional relationship between the subject and the probe is initialized, and then a photoacoustic wave image (ultrasound image) captured using the probe and an optically-captured image (optical camera image) are registered from markers reflected in the photoacoustic wave image and the optically-captured image.

SUMMARY

In the technique disclosed in JP2019-097861A, there is a case in which the registration between the optical camera image and the ultrasound image cannot be sufficiently performed. For example, in the technique described in JP2019-097861A, since a plurality of markers of the same type are provided, there is a possibility that the marker reflected in the optically-captured image and the marker reflected in the ultrasound image are erroneously associated with each other. In a case in which the marker reflected in the optically-captured image and the marker reflected in the ultrasound image are erroneously associated with each other, an accuracy of the registration between the photoacoustic wave image and the optically-captured image is lowered.

The present disclosure has been made in consideration of the above-described circumstances, and an object of the present disclosure is to provide an image processing apparatus, a system, an image processing method, and an image processing program capable of improving an accuracy of registration between an optical camera image and an ultrasound image.

In order to achieve the above object, a first aspect of the present disclosure provides an image processing apparatus comprising: at least one processor, in which the processor acquires an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject, detects a region of interest from the ultrasound image of the subject, detects a first marker image representing the marker from the optical camera image of the subject, detects a second marker image representing the marker from the ultrasound image of the subject, and performs registration between the optical camera image of the subject and the ultrasound image of the subject based on the first feature of the first marker image and the second feature of the second marker image and displays an image representing the region of interest superimposed on the optical camera image of the subject.

A second aspect of the present disclosure provides the image processing apparatus according to the first aspect, in which the first feature is a feature corresponding to at least one of a color, a shape, or a size.

A third aspect of the present disclosure provides the image processing apparatus according to the first aspect, in which the second feature is a feature corresponding to at least one of a brightness, a depth of disposition, a shape, or a size.

A fourth aspect of the present disclosure provides the image processing apparatus according to the first aspect, in which the region of interest is a blood vessel.

A fifth aspect of the present disclosure provides the image processing apparatus according to the first aspect, in which the processor derives a position of a probe for scanning a surface of the subject and generating the ultrasound image, based on at least one of the first marker image or the second marker image, and outputs information indicating a warning in a case in which the position of the probe is other than a predetermined imaging position.

A sixth aspect of the present disclosure provides the image processing apparatus according to the fifth aspect, in which the plurality of markers are disposed in a plurality of rows, and in a case in which capturing of the ultrasound image of the subject is performed a plurality of times while imaging the plurality of rows in one time of scanning and shifting the rows, the predetermined imaging position is a position where a part of the plurality of rows previously imaged and a part of the plurality of rows currently imaged overlap.

A seventh aspect of the present disclosure provides the image processing apparatus according to the first aspect, in which the processor outputs information indicating a warning in a case in which one second marker image is included in a plurality of the ultrasound images.

An eighth aspect of the present disclosure provides the image processing apparatus according to the first aspect, in which the plurality of markers are disposed in a plurality of rows, and in a case in which capturing of a plurality of the ultrasound images is performed while imaging the plurality of rows in one time of scanning, and one second marker image is included in the ultrasound image of the subject, the processor estimates an angle of a probe with respect to the disposition of the marker based on a disposition interval of the plurality of markers, and performs registration between the optical camera image of the subject and the ultrasound image of the subject based on the estimated angle of the probe, the first feature of the first marker image, and the second feature of the second marker image.

In addition, in order to achieve the above object, a ninth aspect of the present disclosure provides a system comprising: an ultrasonography apparatus; an optical camera; a plurality of markers; and the image processing apparatus according to the present disclosure.

In addition, in order to achieve the above object, a tenth aspect of the present disclosure provides an image processing method executed by a processor, the image processing method comprising: acquiring an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject; detecting a region of interest from the ultrasound image of the subject; detecting a first marker image representing the marker from the optical camera image of the subject; detecting a second marker image representing the marker from the ultrasound image of the subject; and performing registration between the optical camera image of the subject and the ultrasound image of the subject based on the first feature of the first marker image and the second feature of the second marker image and displaying an image representing the region of interest superimposed on the optical camera image of the subject.

In addition, in order to achieve the above object, an eleventh aspect of the present disclosure provides an image processing program causing a processor to execute a process comprising: acquiring an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject; detecting a region of interest from the ultrasound image of the subject; detecting a first marker image representing the marker from the optical camera image of the subject; detecting a second marker image representing the marker from the ultrasound image of the subject; and performing registration between the optical camera image of the subject and the ultrasound image of the subject based on the first feature of the first marker image and the second feature of the second marker image and displaying an image representing the region of interest superimposed on the optical camera image of the subject.

According to the present disclosure, it is possible to improve the accuracy of the registration between the optical camera image and the ultrasound image.

BRIEF DESCRIPTION OF THE DRAWINGS

FIG. 4 is a diagram showing an example of an ultrasound image.

FIG. 5 is a diagram showing an example of a state in which a marker group is disposed on a subject.

FIG. 6A is a perspective view showing an example of the marker group according to the embodiment.

FIG. 13 is a flowchart showing an example of a flow of image processing executed in the main body portion of the ultrasonography apparatus according to the embodiment.

DETAILED DESCRIPTION

Hereinafter, an embodiment of the present invention will be described in detail with reference to the drawings. The present embodiment does not limit the present invention.

Figure 1:
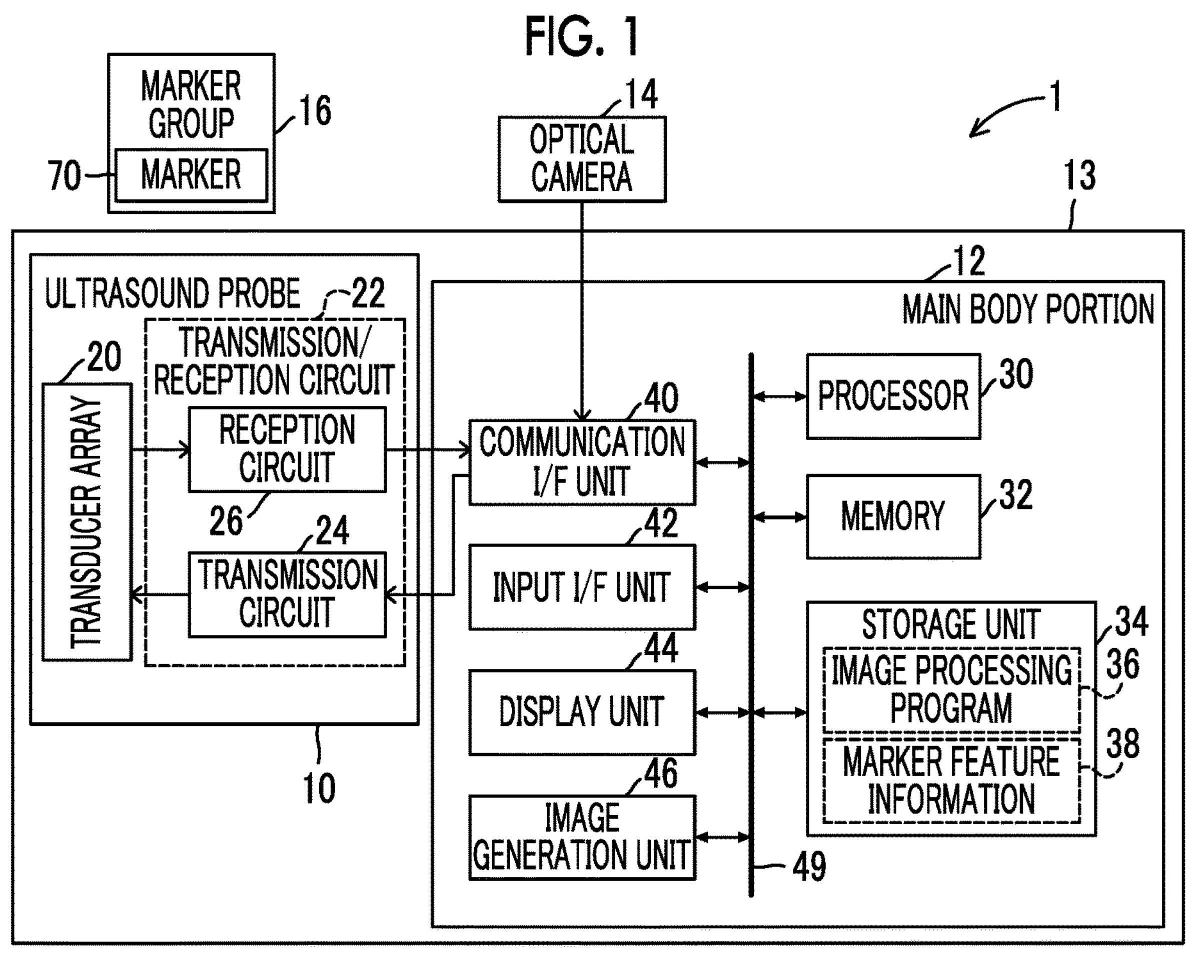
FIG. 1 is a block diagram showing an example of an overall configuration of a medical image capturing system according to an embodiment.

First, an example of an overall configuration of a medical image capturing system 1 according to the present embodiment will be described. FIG. 1 shows a block diagram showing an example of the overall configuration of the medical image capturing system 1 according to the present embodiment. As shown in FIG. 1, the medical image capturing system 1 according to the present embodiment comprises an ultrasonography apparatus 13, an optical camera 14, and a marker group 16. The medical image capturing system 1 according to the present embodiment is an example of a system according to the present disclosure.

As shown in FIG. 1, the ultrasonography apparatus 13 according to the present embodiment comprises an ultrasound probe 10 and a main body portion 12.

The ultrasound probe 10 comprises a transducer array 20 and a transmission/reception circuit 22 including a transmission circuit 24 and a reception circuit 26. The transducer array 20 comprises a plurality of transducers (not shown) arranged in a one-dimensional or two-dimensional manner. As an example, in the present embodiment, an aspect in which the ultrasound probe 10 is a linear-type ultrasound probe in which a plurality of transducers are linearly arranged will be described. The ultrasound probe 10 is not limited to this aspect, and may be a convex-type or sectortype ultrasound probe in which the transducers are arranged in a curved manner. Each of the plurality of transducers transmits an ultrasonic wave based on a drive signal applied from the transmission circuit 24, receives an ultrasound echo generated in a subject, and outputs an electric signal in response to the received ultrasound echo.

Each of the plurality of transducer is configured by forming electrodes at both ends of a piezoelectric body which is a piezoelectric material, such as piezoelectric ceramic represented by lead zirconate titanate (PZT), a polymeric piezoelectric element represented by poly vinylidene di fluoride (PVDF), and piezoelectric single crystal represented by lead magnesium niobate-lead titanate (PMN-PT).

The transmission circuit 24 causes the transducer array 20 to transmit an ultrasound beam toward the subject. Specifically, the transmission circuit 24 includes, for example, a plurality of pulse generators (not shown), and, based on a transmission delay pattern selected in response to a control signal from an imaging controller 90 of the main body portion 12, each delay amount is adjusted to supply the drive signal and apply a voltage to each of the plurality of transducers included in the transducer array 20. Each drive signal is a pulse-like or continuous wave-like voltage signal, and in a case in which a voltage is applied to the electrodes of the transducers of the transducer array 20, the piezoelectric body expands and contracts. As a result of the expansion and contraction, pulsed or continuous ultrasonic waves are generated from each transducer, and an ultrasound beam is formed from a combined wave of these ultrasonic waves.

The transmitted ultrasound beam is reflected by each part (for example, a blood vessel or other tissue) in the subject, an instrument disposed in the subject, or the like, thereby generating an ultrasound echo. The generated ultrasound echo propagates in the subject and is received by the plurality of transducers included in the transducer array 20. Each transducer generates an electric signal corresponding to the received ultrasound echo. The electric signal generated in each transducer is output to the reception circuit 26.

Figure 2:
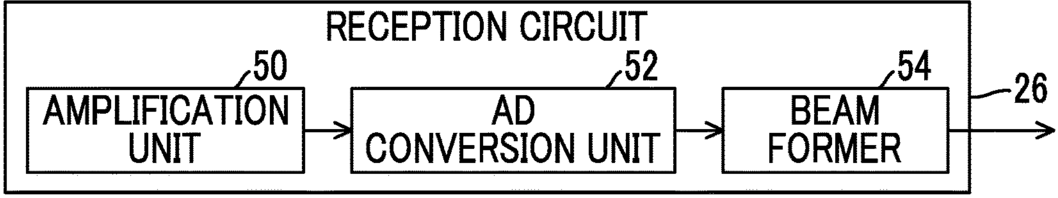
FIG. 2 is a block diagram showing an example of a configuration of a reception circuit.

The reception circuit 26 generates a sound ray signal by performing processing on a signal (strictly speaking, an analog electric signal) output from the transducer array 20 in accordance with the control signal from the imaging controller 90 of the main body portion 12. FIG. 2 is a block diagram showing an example of a configuration of the reception circuit 26 according to the present embodiment. As shown in FIG. 2, the reception circuit 26 includes, for example, an amplification unit 50, an analog digital (AD) conversion unit 52, and a beam former 54.

The amplification unit 50 amplifies the electric signal output from each of the plurality of transducers included in the transducer array 20, and outputs the amplified electric signal to the AD conversion unit 52. The AD conversion unit 52 converts the amplified electric signal into digital reception data, and outputs each piece of the converted reception data to the beam former 54. The beam former 54 performs reception focus processing by giving and adding delay with respect to each piece of the reception data converted by the AD conversion unit 52, in accordance with a sound velocity or a sound velocity distribution set based on a reception delay pattern selected in response to the control signal from the imaging controller 90 of the main body portion 12. Through the reception focusing processing, a sound ray signal in which each piece of the reception data converted by the AD conversion unit 52 is phased and added and the focus of the ultrasound echo is narrowed is generated. The generated sound ray signal is output to the image generation unit 46 via a communication interface (I/F) unit 40 of the main body portion 12.

On the other hand, the main body portion 12 comprises a processor 30, a memory 32, a storage unit 34, the communication I/F unit 40, an input I/F unit 42, a display unit 44, and the image generation unit 46. The processor 30, the memory 32, the storage unit 34, the communication I/F unit 40, the input I/F unit 42, the display unit 44, and the image generation unit 46 are connected to each other via a bus 49 such as a system bus or a control bus such that various kinds of information can be exchanged.

The processor 30 reads out various programs, which include an image processing program 36 stored in the storage unit 34, to the memory 32 and executes processing according to the read-out program. Accordingly, the processor 30 controls capturing of an ultrasound image, and image processing on the ultrasound image and an optical camera image. The memory 32 is a work memory that is used for the processor 30 to execute processing.

The storage unit 34 stores image data of the ultrasound image generated by the image generation unit 46, image data of the optical camera image acquired from the optical camera 14, the image processing program 36, marker feature information 38 to be described in detail below, and various other kinds of information. Specific examples of the storage unit 34 include a hard disk drive (HDD), a solid state drive (SSD), and a secure digital (SD) card.

The communication I/F unit 40 performs communication of various kinds of information with an external device of the ultrasound probe 10, the optical camera 14, and the main body portion 12 through wireless communication such as WiFi (registered trademark) or Bluetooth (registered trademark) or wired communication. A control signal for capturing the ultrasound image is output from the main body portion 12 to the ultrasound probe 10 via the communication I/F unit 40. In addition, a sound ray signal is input from the ultrasound probe 10 to the main body portion 12 via the communication I/F unit 40. In addition, image data representing the optical camera image is input from the optical camera 14 to the main body portion 12 via the communication I/F unit 40. Hereinafter, the image data representing the optical camera image is simply referred to as an "optical camera image". For example, it is said that an optical camera image is input from the optical camera 14 to the main body portion 12.

The input I/F unit 42 and the display unit 44 function as a user interface. The display unit 44 provides a user with various kinds of information regarding the capturing of the ultrasound image. The display unit 44 is not particularly limited, and examples of the display unit 44 include a liquid crystal monitor and a light emitting diode (LED) monitor. In addition, the input I/F unit 42 is operated by the user in order to input various instructions regarding the capturing of the ultrasound image or the like. The input I/F unit 42 is not particularly limited, and examples of the input I/F unit 42 include a keyboard, a touch pen, and a mouse. A touch panel display in which the input I/F unit 42 and the display unit 44 are integrated may be adopted.

Figure 3:
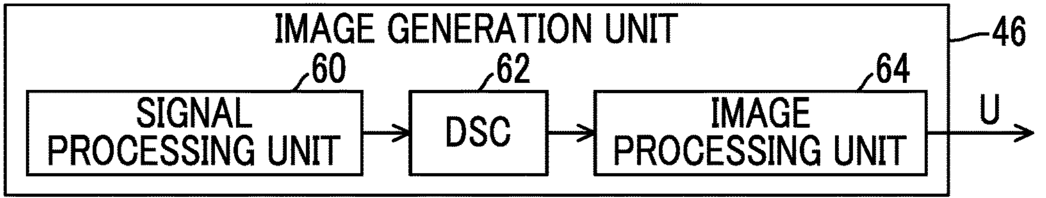
FIG. 3 is a block diagram showing an example of a configuration of an image generation unit.

The image generation unit 46 has a function of generating the ultrasound image based on the sound ray signal input from the reception circuit 26 of the ultrasound probe 10. FIG. 3 shows a block diagram showing an example of a configuration of the image generation unit 46 according to the present embodiment. As shown in FIG. 3, the image generation unit 46 includes, for example, a signal processing unit 60, a digital scan converter (DSC) 62, and an image processing unit 64. The signal processing unit 60 generates a B-mode image signal representing an ultrasound image U by performing, on the sound ray signal generated by the reception circuit 26, attenuation correction due to a distance according to a depth of a reflection position of the ultrasonic wave and then performing envelope detection processing. The DSC 62 converts the B-mode image signal generated by the signal processing unit 60 into an image signal according to a normal television signal scanning method by raster conversion or the like. The image processing unit 64 performs required various image processing such as gradation processing on the B-mode image signal input from the DSC 62, and then outputs the B-mode image signal. The B-mode image signal output from the image generation unit 46 corresponds to the ultrasound image U.

FIG. 4 shows an example of the ultrasound image U generated by the image generation unit 46. The ultrasound image U shown in FIG. 4 shows a cross section of a blood vessel B. Here, the cross section of the blood vessel B means a cut surface orthogonal to an extension direction of the blood vessel B. In the present embodiment, as shown in FIG. 4, in the ultrasound image U, each portion of the blood vessel B in the ultrasound image U, in which a direction connecting a body surface S and an inside of the subject is called a depth direction D, is displayed in the depth direction D at a position corresponding to a distance from the body surface S of the subject with which the ultrasound probe 10 is in contact, that is, a depth.

On the other hand, the optical camera 14 receives visible light and generates the optical camera image based on the received visible light. The optical camera image obtained by the optical camera 14 is output to the ultrasonography apparatus 13.

Figure 6B:
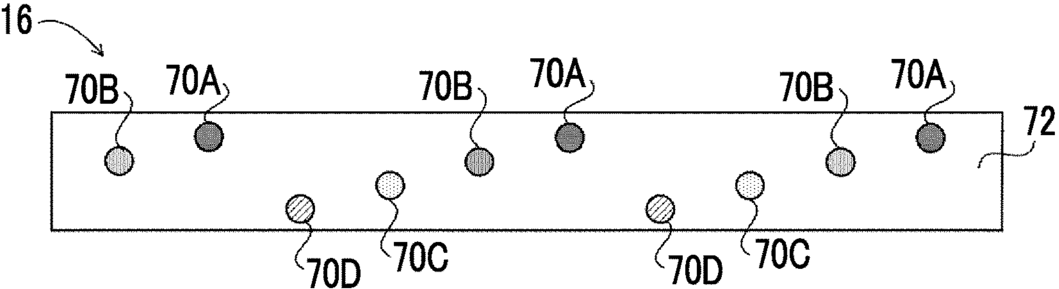
FIG. 6B is a plan view of the marker group shown in FIG. 6A as viewed from a direction of an arrow A.
Figure 6C:
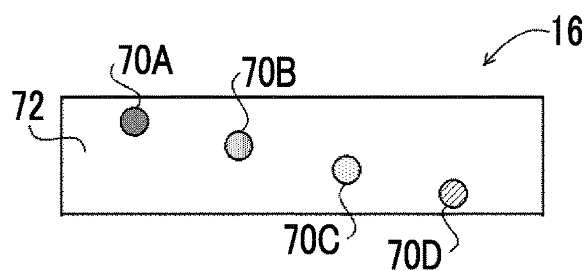
FIG. 6C is a plan view of the marker group shown in FIG. 6A as viewed from a direction of an arrow B.

The marker group 16 includes a plurality of markers 70 and is provided on the subject. The ultrasonography apparatus 13 and the optical camera 14 capture the subject and the marker group 16 in a state where the marker group 16 is provided on the subject. FIG. 5 shows an example of a state where the marker group 16 is provided on a subject W. In addition, FIG. 6A shows a perspective view showing an example of the marker group 16 according to the present embodiment. In addition, FIG. 6B shows a plan view of the marker group 16 shown in FIG. 6A as viewed from a direction of an arrow A, and FIG. 6C shows a plan view of the marker group 16 shown in FIG. 6A as viewed from a direction of an arrow B.

As shown in FIG. 5 and FIGS. 6A to 6C, in the marker group 16 according to the present embodiment, ten types of markers 70A to 70D are embedded in a gel pad 72. In the present embodiment, in a case in which the ten types of markers 70A to 70D are generically referred to without distinguishing between the types, the reference numeral indicating the type is omitted and referred to as the marker 70.

The gel pad 72 is formed of a material whose acoustic impedance is close to that of water or a soft tissue of a human body. Examples of the material of the gel pad 72 include a non-hydrous gel substance such as urethane rubber and silicone rubber, and a polymeric hydrous gel such as polyvinyl alcohol and polyethylene oxide.

Figure 7:
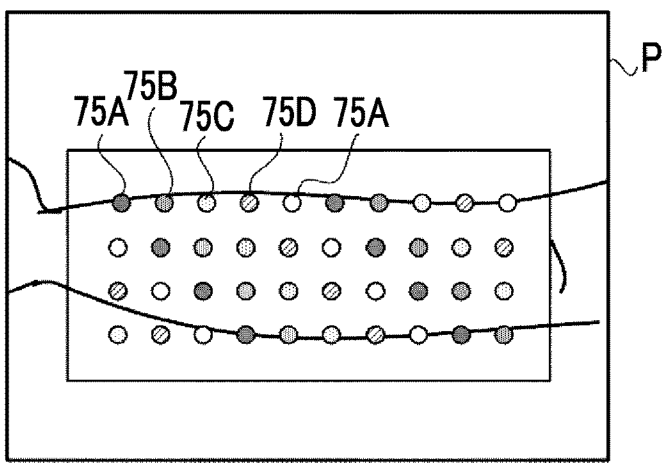
FIG. 7 is an example of an optical camera image captured in a state where the marker group is provided on the subject.

The marker 70 has a first feature identifiable by the optical camera image and a second feature identifiable by the ultrasound image. Each of the markers 70A to 70D can be distinguished from other types of markers 70 in the optical camera image based on the first feature. In the present embodiment, as the first feature, a surface color of the marker 70 is adopted. There are four types (four colors) of the surface color depending on a type of the marker. Specifically, a surface of the marker 70A is red, a surface of the marker 70B is green, a surface of the marker 70C is blue, and a surface of the marker 70D is purple. Accordingly, it is possible to identify which of the four types of the marker 70 is, based on a color of an image representing the marker 70 in the optical camera image in which the marker 70 is captured. Hereinafter, in the present embodiment, a marker image in the optical camera image will be referred to as a "first marker image". FIG. 7 shows an example of an optical camera image P captured by the optical camera 14. Specifically, in a case in which the color of the first marker image 75 (75A) is red, it can be identified as the marker 70A. In addition, in a case in which the color of the first marker image 75 (75B) is green, it can be identified as the marker 70B, in a case in which the color of the first marker image 75 (75C) is blue, it can be identified as the marker 70C, and in a case in which the color of the first marker image 75 (75D) is purple, it can be identified as the marker 70D.

Figure 8:
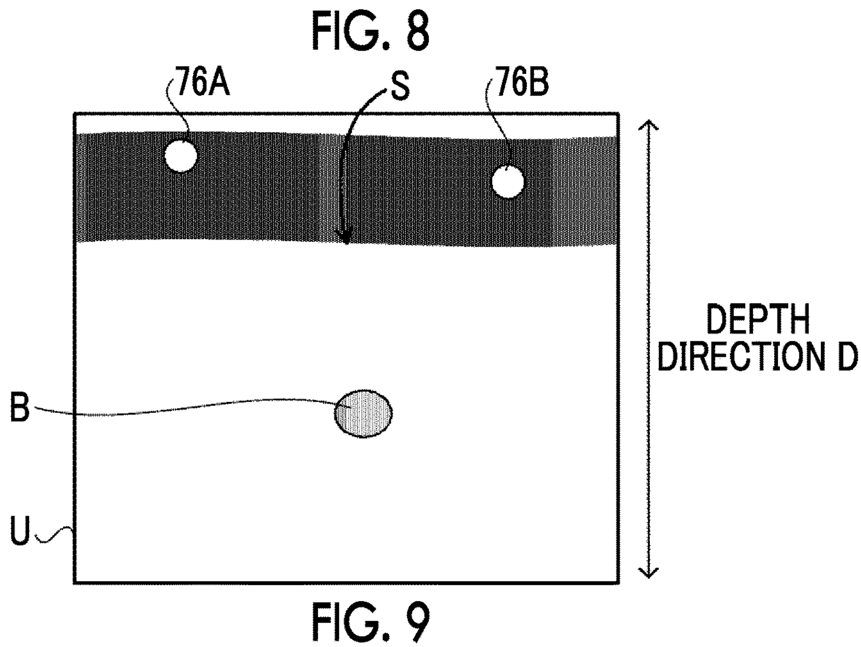
FIG. 8 is an example of an ultrasound image captured in a state where the marker group is provided on the subject.

In addition, each of the markers 70A to 70D can be distinguished from other types of markers 70 in the ultrasound image U based on the second feature. In the present embodiment, as the second feature, a depth at which the marker 70 is embedded in the gel pad 72 is adopted. The depth at which the marker 70 is embedded in the gel pad 72 corresponds to the depth direction D of the ultrasound image U. There are four types of the depths at which the marker 70 is embedded depending on the type of the marker. Specifically, the marker 70A is embedded at a position of 5 mm from a surface of the gel pad 72. In addition, the marker 70B is embedded at a position of 10 mm from the surface of the gel pad 72. In addition, the marker 70C is embedded at a position of 15 mm from the surface of the gel pad 72. In addition, the marker 70D is embedded at a position of 20 mm from the surface of the gel pad 72. The term "embedded at a depth of 5 mm" means that a center (center of gravity) of the marker 70 is located at a position of 5 mm from the surface of the gel pad 72. In addition, similarly, the term "embedded at a depth of 10 mm" means that the center (center of gravity) of the marker 70 is located at a position of 10 mm from the surface of the gel pad 72. Similarly, the term "embedded at a depth of 15 mm" means that the center (center of gravity) of the marker 70 is located at a position of 15 mm from the surface of the gel pad 72. Similarly, the term "embedded at a depth of 20 mm" means that the center (center of gravity) of the marker 70 is located at a position of 20 mm from the surface of the gel pad 72. Accordingly, it is possible to identify which of the four types of the marker 70 is, based on a position in the depth direction D of a marker image representing the marker 70 in the ultrasound image U in which the marker 70 is captured. Hereinafter, in the present embodiment, a marker image in the ultrasound image U will be referred to as a "second marker image". FIG. 8 shows an example of the ultrasound image U captured by the ultrasonography apparatus 13. The ultrasound image U shown in FIG. 8 includes a second marker image 76A corresponding to the marker 70A and a second marker image 76B corresponding to the marker 70B. Specifically, in a case in which the depth of the second marker image 76 (76A) is 5 mm, it can be identified as the marker 70A. In addition, in a case in which the depth of the second marker image 76 (76B) is 10 mm, it can be identified as the marker 70B, in a case in which the depth of the second marker image 76 is 15 mm, it can be identified as the marker 70C, and in a case in which the depth of the second marker image 76 is 20 mm, it can be identified as the marker 70D.

Figure 9:
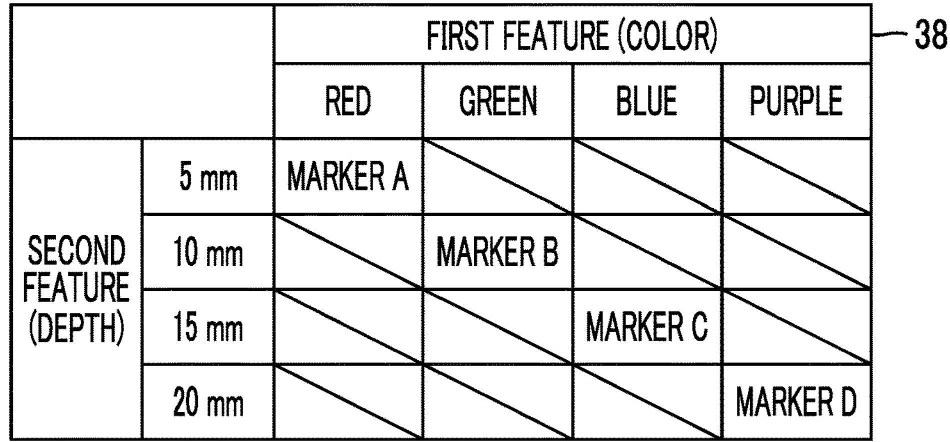
FIG. 9 is a diagram for describing an example of marker feature information according to the embodiment.

FIG. 9 shows an example of marker feature information 38, which is information representing a correspondence relationship between the first feature, the second feature, and the type of the marker 70. As shown in FIG. 1, the marker feature information 38 is stored in the storage unit 34 of the main body portion 12 of the ultrasonography apparatus 13.

As described above, in the medical image capturing system 1 according to the present embodiment, it is possible to identify which of the four types of the marker 70 is, based on the first feature and the second feature. In other words, it is possible to specify the second marker image 76 in the ultrasound image U corresponding to the first marker image 75 in the optical camera image P based on the first feature, the second feature, and the marker feature information 38.

Figure 10:
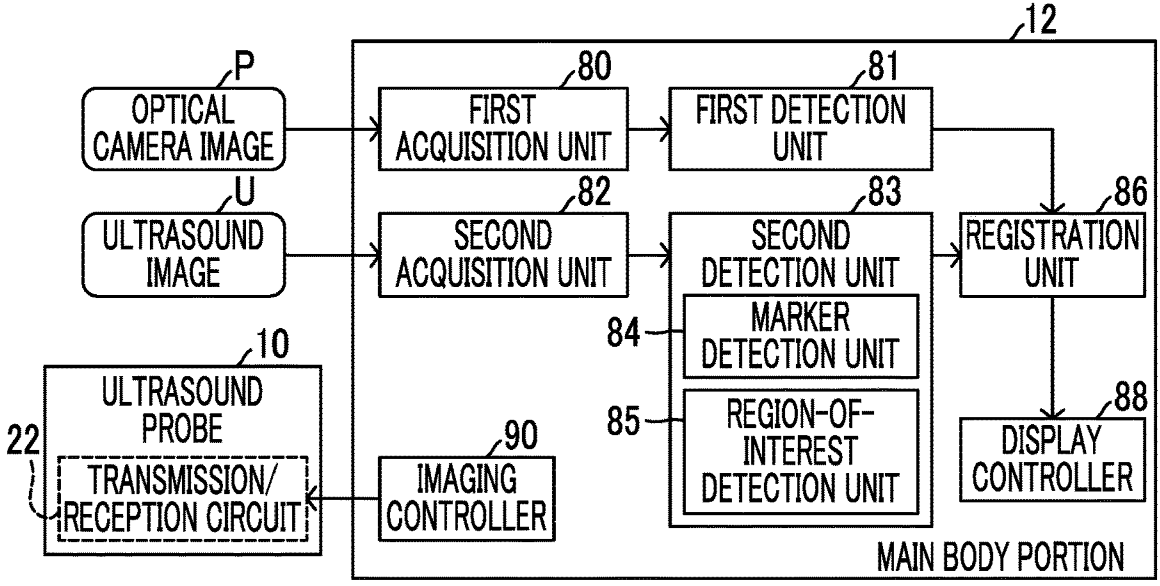
FIG. 10 is a functional block diagram showing an example of a configuration related to a function of a main body portion of an ultrasonography apparatus according to the embodiment.

Next, a functional configuration of the main body portion 12 of the ultrasonography apparatus 13 will be described. FIG. 10 shows a functional block diagram showing an example of a configuration related to a function of the main body portion 12 the ultrasonography apparatus 13 according to the present embodiment. As shown in FIG. 10, the main body portion 12 comprises a first acquisition unit 80, a first detection unit 81, a second acquisition unit 82, a second detection unit 83, a registration unit 86, a display controller 88, and an imaging controller 90. For example, in the main body portion 12 according to the present embodiment, the processor 30 executes the image processing program 36 stored in the storage unit 34, so that the memory 32 functions as the first acquisition unit 80, the first detection unit 81, the second acquisition unit 82, the second detection unit 83, the registration unit 86, the display controller 88, and the imaging controller 90.

The imaging controller 90 has a function of outputting the control signal to the transmission/reception circuit 22 of the ultrasound probe 10 as described above in a case of capturing the ultrasound image U. In a case in which the control signal output from the imaging controller 90 is input to the transmission circuit 24 and the reception circuit 26 of the ultrasound probe 10, the sound ray signal is output from the reception circuit 26 of the ultrasound probe 10 to the image generation unit 46 of the main body portion 12 as described above. Under the control of the imaging controller 90, the transmission/reception circuit 22 of the ultrasound probe 10 and the image generation unit 46 of the main body portion 12 continuously acquire the ultrasound image a plurality of times at a fixed frame rate during a capturing period of the ultrasound image.

The first acquisition unit 80 has a function of acquiring the optical camera image P. As an example, the first acquisition unit 80 according to the present embodiment acquires the optical camera image P from the storage unit 34. The optical camera image P acquired by the first acquisition unit 80 is output to the first detection unit 81.

The first detection unit 81 has a function of detecting the first marker image (see first marker images 75A to 75D in FIG. 15) from the optical camera image P. A method in which the first detection unit 81 detects the first marker image 75 from the optical camera image P is not particularly limited, and, for example, the first detection unit 81 can store typical pattern data of the first marker image 75 in advance as a template, derive a similarity to the pattern data while searching an inside of the optical camera image P with the template, and consider that the first marker image 75 is present at a location where the similarity is equal to or greater than a reference value and the maximum. In addition, examples of the derivation of the similarity include a method using a learning model that has been trained based on the feature amount of the first marker image 75, in addition to simple template matching. For example, a machine learning method such as a support vector machine (SVM) or adaptive boosting (AdaBoost), a general image recognition method using deep learning, or the like can be used.

In addition, for example, the first detection unit 81 may detect the first marker image 75 in the optical camera image P using a first marker image detection model, which is a trained model that has been trained through machine learning by a plurality of the optical camera images P in which the first marker image 75 is labeled. The first marker image detection model is, for example, an object detection algorithm using deep learning. As the first marker image detection model, for example, an object detection model configured by regional CNN (R-CNN), which is a type of convolutional neural network (CNN), can be used. The first marker image detection model detects the first marker image 75 as an object from the input optical camera image P, and outputs information representing the first marker image 75 in the optical camera image P.

As a detection result, the first detection unit 81 outputs, to the registration unit 86, information representing the position and color of the first marker image 75 in the optical camera image P in association with the optical camera image P.

The second acquisition unit 82 has a function of acquiring the ultrasound image U. As an example, the second acquisition unit 82 according to the present embodiment acquires the ultrasound image U from the storage unit 34. The ultrasound image U acquired by the second acquisition unit 82 is output to the second detection unit 83.

The second detection unit 83 includes a marker detection unit 84 and a region-of-interest detection unit 85. The marker detection unit 84 has a function of detecting the second marker image from the ultrasound image U. A method in which the marker detection unit 84 detects the second marker image from the ultrasound image U is not particularly limited, and, for example, the marker detection unit 84 can store typical pattern data of the second marker image 76 in advance as a template, derive a similarity to the pattern data while searching an inside of the ultrasound image U with the template, and consider that the second marker image 76 is present at a location where the similarity is equal to or greater than a reference value and the maximum. In addition, examples of the derivation of the similarity include a method using a learning model that has been trained based on the feature amount of the second marker image 76, in addition to simple template matching. For example, a machine learning method such as a support vector machine (SVM) or adaptive boosting (AdaBoost), a general image recognition method using deep learning, or the like can be used.

In addition, for example, the marker detection unit 84 may detect the second marker image 76 in the ultrasound image U using a second marker image detection model, which is a trained model that has been trained through machine learning by a plurality of the ultrasound images U in which the second marker image 76 is labeled. The second marker image detection model is, for example, an object detection algorithm using deep learning. As the second marker image detection model, for example, an object detection model configured by regional CNN (R-CNN), which is a type of convolutional neural network (CNN), can be used. The second marker image detection model detects the second marker image 76 as an object from the input ultrasound image U, and outputs information representing the second marker image 76 in the ultrasound image U.

The region-of-interest detection unit 85 has a function of detecting a region of interest from the ultrasound image U. In the present embodiment, since the blood vessel B is taken as an example of the region of interest, the region-of-interest detection unit 85 detects the blood vessel B from the ultrasound image U. The method in which the region-of-interest detection unit 85 detects the blood vessel B from the ultrasound image U is not particularly limited. As an example, the region-of-interest detection unit 85 according to the present embodiment analyzes the ultrasound image U according to a known algorithm to detect the blood vessel B in the ultrasound image U. For example, the region-of-interest detection unit 85 can store typical pattern data of a blood vessel region in which the blood vessel B is present in advance as a template, derive a similarity to the pattern data while searching the inside of the ultrasound image U with the template, and consider that the blood vessel B is present at a location where the similarity is equal to or greater than a reference value and is the maximum. In addition, examples of the derivation of the similarity include a method using a learning model that has been trained based on the feature amount of an image representing the blood vessel B, in addition to simple template matching. For example, a machine learning method such as a support vector machine (SVM) or adaptive boosting (AdaBoost), a general image recognition method using deep learning, or the like can be used.

In addition, for example, the region-of-interest detection unit 85 may detect the blood vessel B in the ultrasound image U using a blood vessel detection model, which is a trained model that has been trained through machine learning by a plurality of the ultrasound images U in which the blood vessel B is labeled. The blood vessel detection model is, for example, an object detection algorithm using deep learning. As the blood vessel detection model, for example, an object detection model configured by regional CNN (R-CNN), which is a type of convolutional neural network (CNN), can be used. The blood vessel detection model detects the blood vessel B as an object from the input ultrasound image U, and outputs information representing the blood vessel B in the ultrasound image U.

As a detection result, the second detection unit 83 outputs, to the registration unit 86, information representing the position and depth of the second marker image 76 and the position of the blood vessel B in the ultrasound image U in association with the ultrasound image U.

The registration unit 86 has a function of performing registration between the optical camera image P and the ultrasound image U based on the detection result of the first detection unit 81 and the detection result of the marker detection unit 84. Specifically, the registration unit 86 specifies the type of the marker 70 by referring to the marker feature information 38 stored in the storage unit 34 based on the first feature (color) of the first marker image 75 which is the detection result of the first detection unit 81 and the second feature (depth) of the second marker image 76 which is the detection result of the marker detection unit 84. Further, the registration unit 86 performs registration between the first marker image 75 and the second marker image 76 in accordance with the specified type of the marker 70, whereby performing registration between the optical camera image P and the ultrasound image U.

In addition, the registration unit 86 superimposes the image representing the blood vessel B, which is the detection result of the region-of-interest detection unit 85, on the optical camera image P based on a result of performing the registration between the optical camera image P and the ultrasound image U. The registration unit 86 outputs, to the display controller 88, the image representing the blood vessel B is superimposed on the optical camera image P.

The display controller 88 has a function of causing the display unit 44 of the main body portion 12 to display the optical camera image P on which the image representing the blood vessel B is superimposed.

Next, an operation of the main body portion 12 according to the present embodiment will be described with reference to the drawings.

Figure 11:
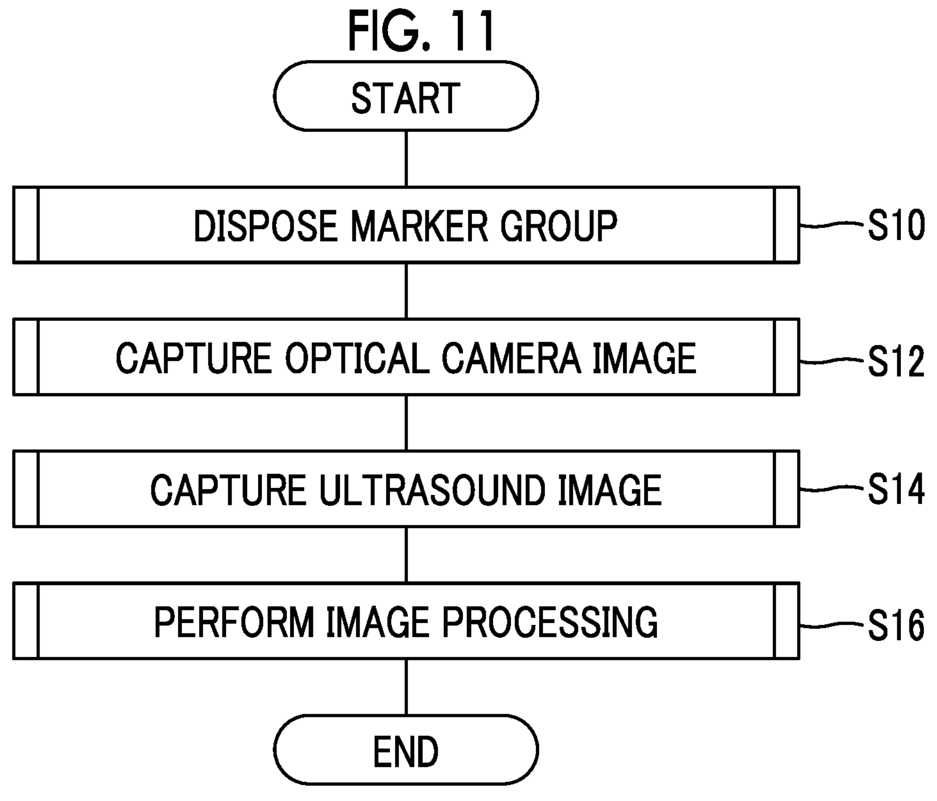
FIG. 11 is a flowchart showing an example of a flow of processing by a medical image capturing system according to the embodiment.

First, an overall flow of processing until the display unit 44 displays the optical camera image P on which the image representing the blood vessel B is superimposed by the medical image capturing system 1 according to the present embodiment will be described. FIG. 11 shows a flowchart showing an example of a flow of processing by the medical image capturing system 1.

In step S10, a technician disposes the marker group 16 on an imaging part of the subject W. In a case in which the imaging part is an arm of the subject W, the state shown in FIG. 5 shown above is obtained.

In next step S12, the technician uses the optical camera 14 to image the subject W in a state where the marker group 16 is provided. As described above, the optical camera image P captured by the optical camera 14 is output to the main body portion 12 and stored in the storage unit 34 of the main body portion 12.

Figure 12:
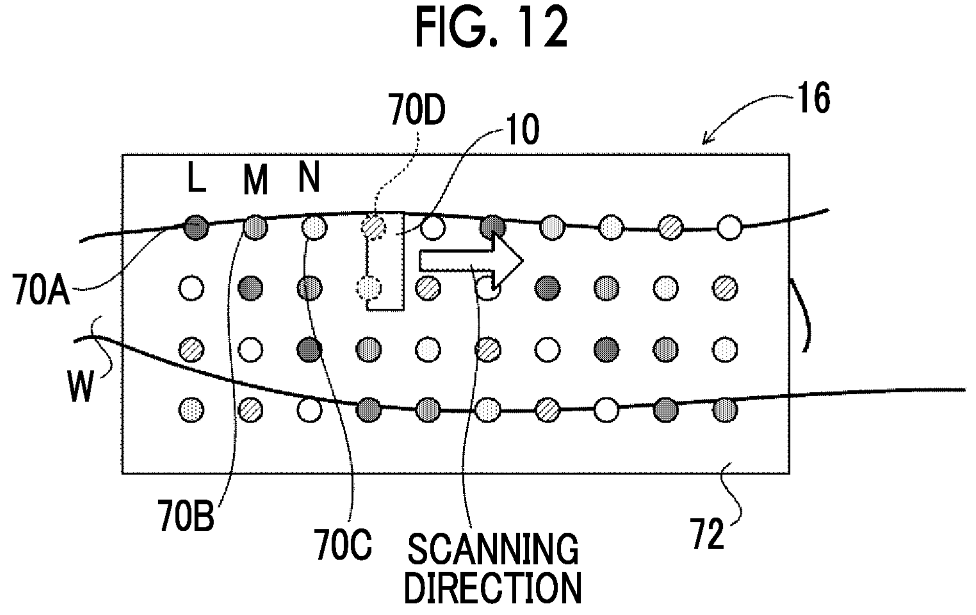
FIG. 12 is a diagram describing a position of an ultrasound probe in capturing the ultrasound image.

In next step S14, the technician scans the surface of the marker group 16 with the ultrasound probe 10 by the ultrasonography apparatus 13, and captures the ultrasound image U. FIG. 12 shows an example of a positional relationship between the ultrasound probe 10 and the marker group 16 in the capturing of the ultrasound image U. As shown in FIG. 12, the imaging is performed while the ultrasound probe 10 is moved in a scanning direction such that the ultrasound image U includes the plurality of markers 70. As described above, the ultrasound probe 10 outputs the sound ray signal to the main body portion 12. The image generation unit 46 of the main body portion 12 generates the ultrasound image U from the sound ray signal. The generated ultrasound image U is stored in the storage unit 34.

In next step S16, the main body portion 12 performs image processing on the optical camera image P and the ultrasound image U, and causes the display unit 44 to display the optical camera image P on which the image representing the blood vessel B is superimposed as described above. In a case in which the process of step S16 ends, a series of processing by the medical image capturing system 1 ends.

Next, the details of the image processing in step S16 will be described. FIG. 13 shows a flowchart showing an example of a flow of the image processing executed in the main body portion 12 according to the present embodiment. As an example, in the main body portion 12 according to the present embodiment, the processor 30 executes the image processing program 36 stored in the storage unit 34 to execute the image processing shown in FIG. 13 as an example.

In step S100 of FIG. 13, the first acquisition unit 80 acquires the optical camera image P as described above.

In next step S102, the second acquisition unit 82 acquires the ultrasound image U as described above.

In next step S104, the first detection unit 81 detects the first marker image from the optical camera image P as described above.

In next step S106, the region-of-interest detection unit 85 of the second detection unit 83 detects the blood vessel B, which is the region of interest, from the ultrasound image U as described above.

In next step S108, the marker detection unit 84 of the second detection unit 83 detects the second marker image from the ultrasound image U as described above.

The order of the process of acquiring the optical camera image and the process of acquiring the ultrasound image is not limited. In other words, the order of steps S100 and S102 is not limited. In addition, the order of the process of detecting the first marker image 75 from the optical camera image P and the process of detecting the second marker image 76 from the ultrasound image U is not limited. In other words, the order of steps S104 and S108 is not limited. In addition, the order of the process of detecting the region of interest from the ultrasound image U and the process of detecting the second marker image 76 from the ultrasound image U is not limited. In other words, the order of steps S106 and S108 is not limited.

Figure 14:
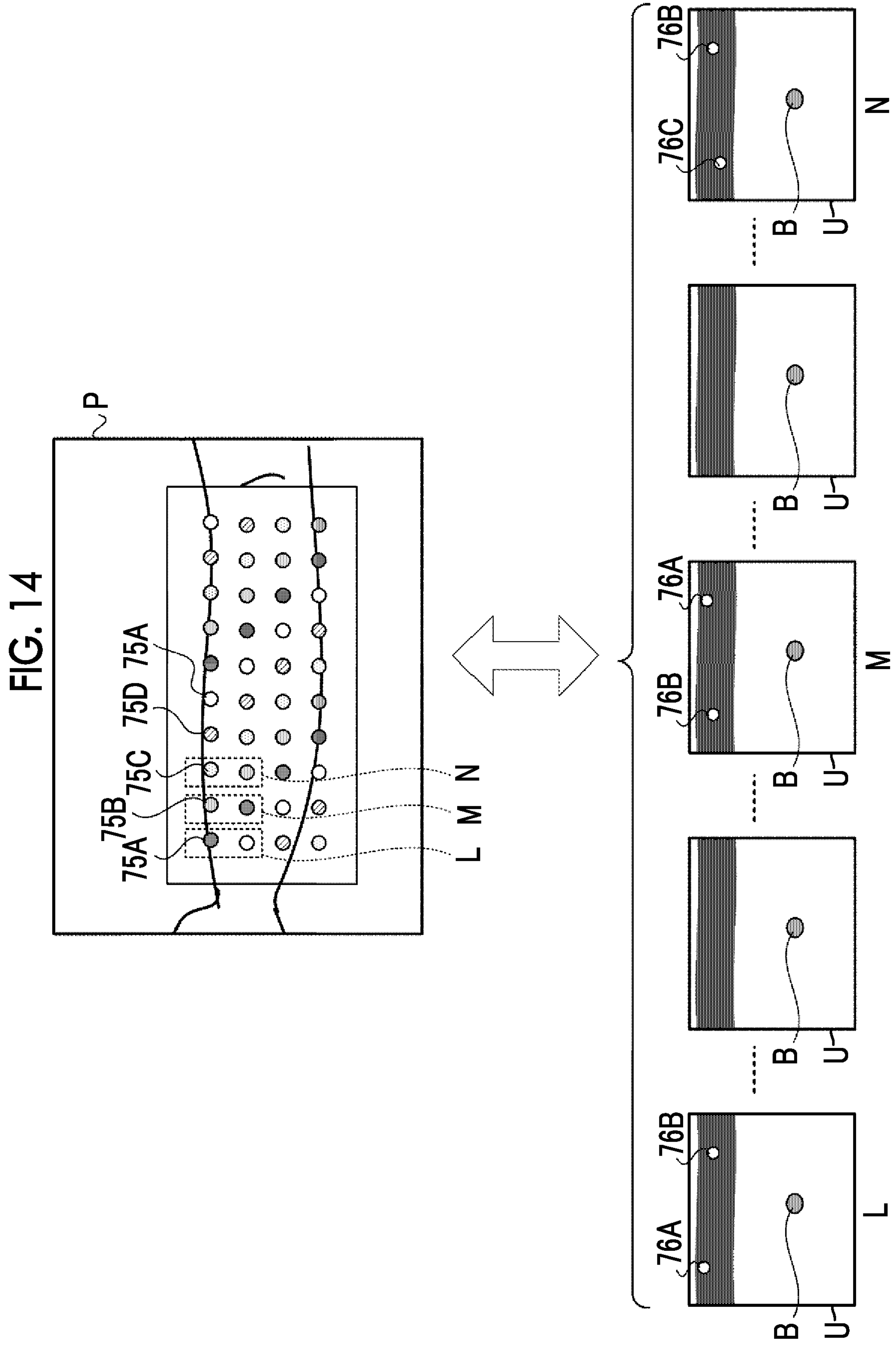
FIG. 14 is a diagram for describing a method of performing registration between the optical camera image and the ultrasound image.

In next step S110, the registration unit 86 performs registration between the optical camera image P and the ultrasound image U based on the first marker image 75 and the second marker image 76 as described above. The registration between the optical camera image P and the ultrasound image U will be described in detail with reference to FIG. 14.

The registration unit 86 associates the ultrasound image U captured in a frame L with a position of the ultrasound probe 10 in the optical camera image P in a case in which the ultrasound image U in the frame L is captured. In addition, the registration unit 86 associates the ultrasound image U captured in a frame M with a position of the ultrasound probe 10 in the optical camera image P in a case in which the ultrasound image U in the frame M is captured. The registration unit 86 associates the ultrasound image U captured in a frame N with a position of the ultrasound probe 10 in the optical camera image P in a case in which the ultrasound image U in the frame N is captured. Similarly, for each frame in which the ultrasound image U including the marker 70 is captured, the ultrasound image U is associated with the position on the optical camera image P.

In next step S112, as described above, the registration unit 86 superimposes the image of the blood vessel B, which is the region of interest, on the optical camera image P. A method of superimposing the image of the blood vessel B on the optical camera image P will be described with reference to FIG. 14.

The second marker image 76 is not included in the ultrasound image U captured in a state where the ultrasound probe 10 is positioned between arrangements of the markers 70. For example, in the example shown in FIG. 12, the second marker image 76 is not included in the ultrasound image U captured between the frame L and the frame M and in the ultrasound image U captured between the frame M and the frame N. Therefore, the ultrasound probe 10 is considered to have moved at a constant rate, and the ultrasound image U captured between the frame L and the frame M is evenly disposed between the position of the ultrasound probe 10 in the optical camera image P in a case in which the frame L is imaged and the position of the ultrasound probe 10 in a case in which the frame M is imaged. In addition, the ultrasound image U captured between the frame M and the frame N is evenly disposed between the position of the ultrasound probe 10 in the optical camera image P in a case in which the frame M is imaged and the position of the ultrasound probe 10 in a case in which the frame N is imaged.

Figure 15:
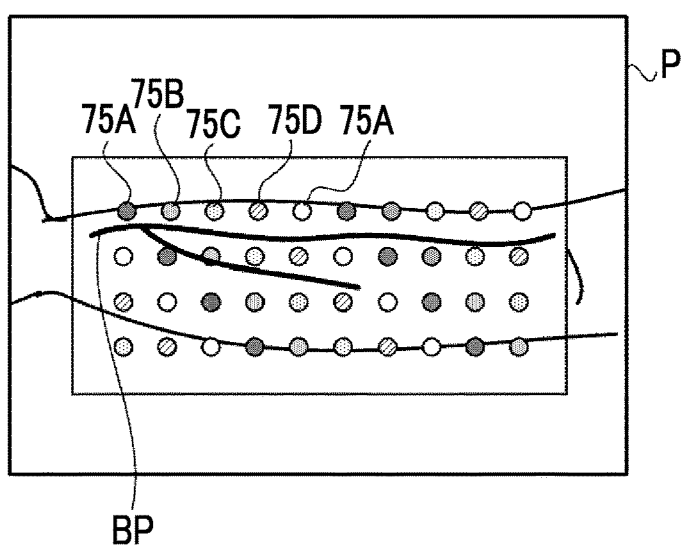
FIG. 15 is a diagram for describing an optical camera image on which an image representing a blood vessel is superimposed.

Then, in a state where registration between the optical camera image P and the ultrasound image U is performed as described above, the registration unit 86 generates an image in which the images representing the blood vessel B detected from the ultrasound images U are connected and superimposes the generated image on the optical camera image P. FIG. 15 shows an example of a state where an image BP representing the blood vessel B is superimposed on the optical camera image P.

In next step S114, as described above, the display controller 88 causes the display unit 44 to display the optical camera image P (see FIG. 15) on which the image of the blood vessel B is superimposed. In a case in which the process in step S114 ends, the image processing shown in FIG. 13 ends.

Imaging Control Processing

Figure 16:
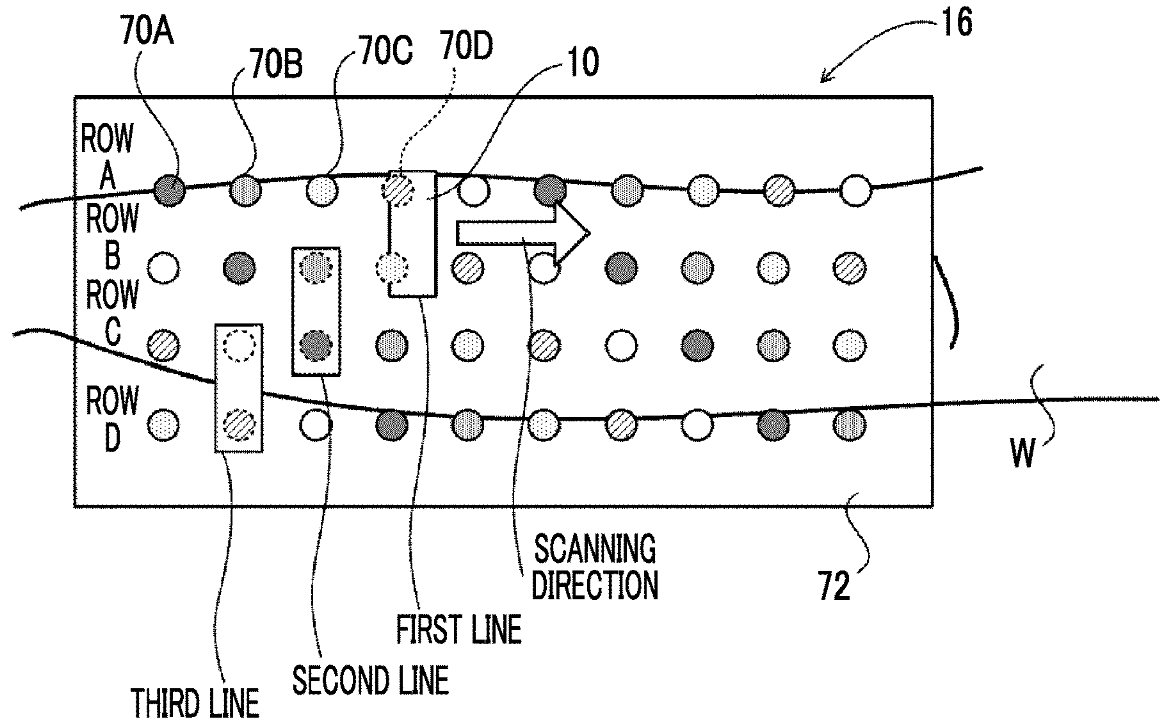
FIG. 16 is a diagram for describing a position of an ultrasound probe in the ultrasound image.

As described above, in a case of performing registration between the optical camera image P and the ultrasound image U, it is preferable that one ultrasound image U includes a plurality of the second marker images 76 as described above. In addition, as shown in FIG. 16, in a case in which the ultrasound probe 10 is moved in the scanning direction to capture the ultrasound image U, it is preferable that the ultrasound probe 10 is disposed such that the markers 70 in the same row are included in the scanning of each line. In the example shown in FIG. 16, the markers 70 of a row B are imaged in an overlapping manner in the imaging of a first line and in the imaging of a second line. In addition, the markers 70 of a row C are imaged in an overlapping manner in the imaging of the second line and in the imaging of a third line.

Figure 17:
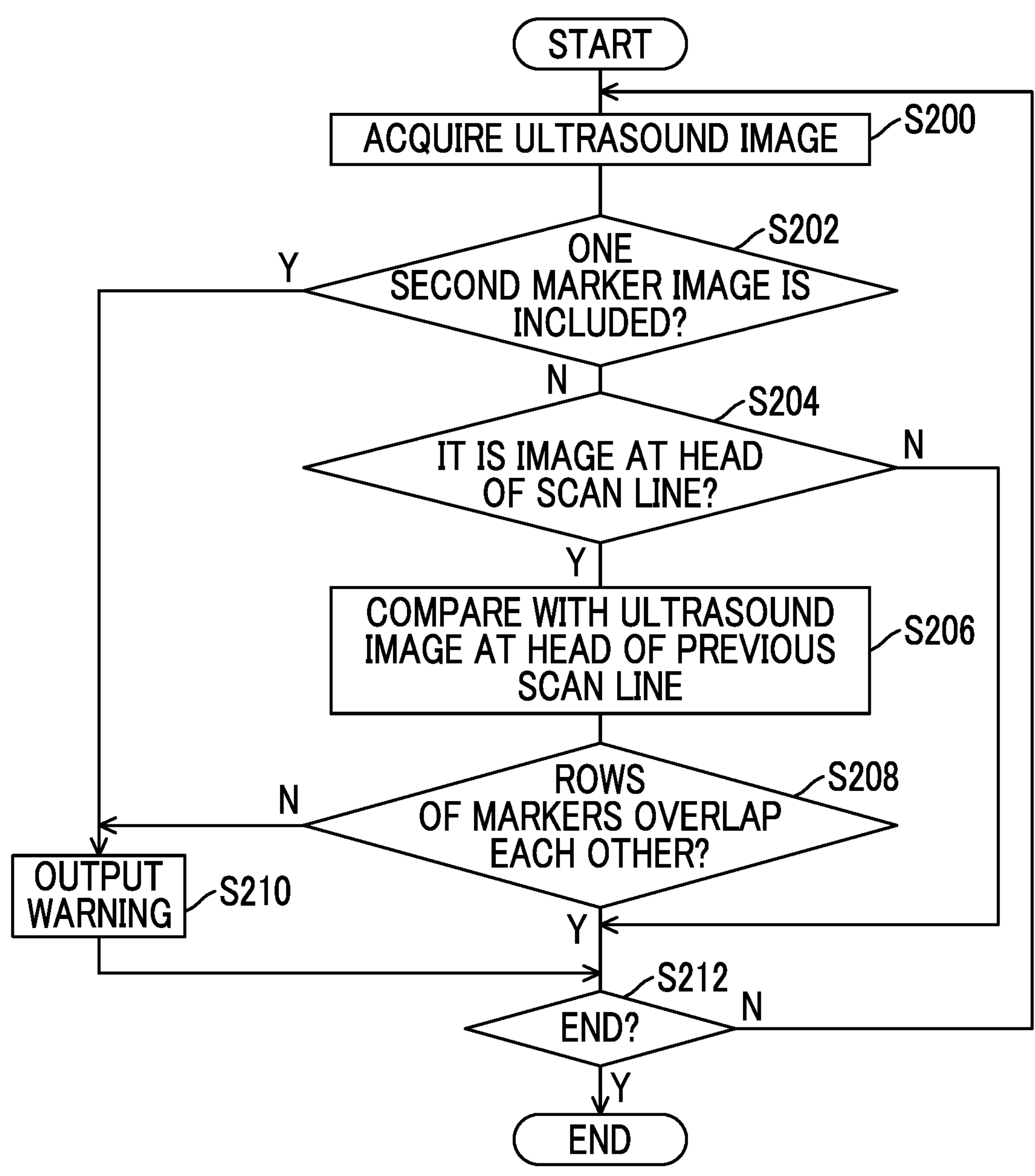
FIG. 17 is a flowchart showing an example of imaging control processing executed by an imaging controller of the ultrasonography apparatus according to the embodiment.

In the present embodiment, the imaging controller 90 executes imaging control processing for capturing the ultrasound image U as described above. FIG. 17 shows a flowchart showing an example of the imaging control processing executed in the imaging controller 90 according to the present embodiment. The control processing shown in FIG. 17 is executed in real time during the capturing of the ultrasound image U in a case in which the imaging instruction of the ultrasound image U is received in the capturing of the ultrasound image U in step S14 of FIG. 11.

In step S200 of FIG. 17, the imaging controller 90 acquires the ultrasound image U.

In next step S202, the imaging controller 90 determines whether or not one second marker image 76 is included in the ultrasound image U. The imaging controller 90 detects the second marker image 76 from the ultrasound image U in the same manner as the marker detection unit 84 of the second detection unit 83 described above. In a case in which one second marker images 76 is included in the ultrasound image U, a determination result in step S202 is YES, and the process proceeds to step S210. On the other hand, in a case in which the number of the second marker images 76 included in the ultrasound image U is not one, in other words, in a case in which the second marker image 76 is not included in the ultrasound image U and in a case in which the number of the second marker images 76 include in the ultrasound image U is two or more, a determination result in step S202 is NO, the process proceeds to step S204.

In step S204, the imaging controller 90 determines whether or not the acquired ultrasound image U is an image at a head of a scan line. In a case in which the acquired ultrasound image U is not the image at the head of the scan line, a determination result in step S204 is NO, and the process proceeds to step S212. On the other hand, in a case in which the acquired ultrasound image U is the image at the head of the scan line, a determination result in step S204 is YES, and the process proceeds to step S206.

In step S206, the imaging controller 90 compares the acquired ultrasound image U with the ultrasound image U at the head of the previous scan line. In the example shown in FIG. 16, in a case in which the ultrasound image U at the head of the second line is acquired, it is compared with the ultrasound image U at the head of the first line, and, in a case in which the ultrasound image U at the head of the third line is acquired, it is compared with the ultrasound image U at the head of the second line.

As described above, the imaging controller 90 determines whether or not both the ultrasound images U include the markers 70 in the same row. In the example shown in FIG. 16, the imaging controller 90 determines whether or not the markers 70 of the row B are included in the ultrasound image U of the first line and in the ultrasound image U of the second line. In addition, the imaging controller 90 determines whether or not the markers 70 of the row C are included in the ultrasound image U of the second line and in the ultrasound image U of the third line. The imaging controller 90 according to the present embodiment can acquire information regarding the arrangement of the markers 70 in the marker group 16, and makes a determination based on the acquired information.

In next step S208, the imaging controller 90 determines whether or not the rows of the markers 70 overlap each other as described above. In a case in which the rows does not overlap each other, a determination result in step S208 is NO, and the process proceeds to step S210.

In step S210, the imaging controller 90 outputs a warning that the capturing of the ultrasound image U is not appropriate, and then proceeds to step S212. For example, the imaging controller 90 causes the display unit 44 to display information indicating that the position of the ultrasound probe 10 is not appropriate.

On the other hand, in a case in which the rows of the markers 70 overlap each other, a determination result in step S208 is YES, and the process proceeds to step S212. In step S212, the imaging controller 90 determines whether or not to end the imaging control processing. For example, in a case in which the input I/F unit 42 is used to receive an instruction to end imaging given by the technician, the imaging controller 90 determines to end the imaging control processing. A determination result in step S212 is NO until the imaging control processing ends, the process returns to step S200, and the processes of steps S200 to S210 are repeated. On the other hand, in a case in which it is determined to end the imaging control processing, a determination result in step S212 is YES, the imaging control processing shown in FIG. 17 ends.

By performing the imaging control processing in this manner, it is possible to capture an ultrasound image U suitable for performing registration between the optical camera image P and the ultrasound image U.

As described above, the region-of-interest detection unit 85 of the main body portion 12 of the above-described aspect detects the blood vessel B, which is the region of interest, from the ultrasound image U of the subject W. The first detection unit 81 detects the first marker image 75 representing the marker 70 from the optical camera image P of the subject W. The region-of-interest detection unit 85 detects the second marker image 76 representing the marker 70 from the ultrasound image U of the subject W. The registration unit 86 performs registration between the optical camera image P of the subject W and the ultrasound image U of the subject W based on the first feature of the first marker image 75 and the second feature of the second marker image 76. The display controller 88 causes the display unit 44 to display the image BP representing the blood vessel B, which is the region of interest, superimposed on the optical camera image P of the subject W.

As described above, according to the ultrasonography apparatus 13 of the above-described aspect, the registration between the ultrasound image U and the optical camera image P captured using the marker group 16 that has the first feature identifiable by the optical camera image P and the second feature identifiable by the ultrasound image U and that is distinguishable from other markers 70 based on the first feature and the second feature is performed based on the first feature and the second feature.

Accordingly, according to the ultrasonography apparatus 13 of the above-described aspect, it is possible to improve the accuracy of the registration between the optical camera image P and the ultrasound image U.

The technique of the present disclosure is not limited to each of the above-described embodiments, and various modifications can be made.

In the above-described aspect, an aspect in which the color of the marker 70 is applied as the first feature identifiable by the optical camera image P has been described, but the first feature is not limited to the color. For example, the shape of the marker 70 may be applied. Examples of the shape of the marker 70 include a circular (spherical) shape, an elliptical shape (ellipsoid), and an N-polygonal shape (columnar body having an N-shaped cross section) as seen from a top surface.

In addition, for example, the size of the marker 70 may be applied as the first feature.

In addition, in the above-described aspect, an aspect in which the depth at which the marker 70 is disposed is applied as the second feature identifiable by the ultrasound image U has been described, but the second feature is not limited to the depth at which the marker is disposed. For example, the shape of the marker 70 may be applied. In this case, the markers 70 may be disposed so as to match the shape of the second marker image 76 in the ultrasound image U even though the markers have the same aspect. For example, in a case in which the marker 70 is an ellipsoid, the shape of the second marker image 76 in the ultrasound image U can be varied by varying an angle formed by a major axis direction of the ellipsoid and the depth direction D. In a case in which the ellipsoidal marker 70 and the spherical marker 70 are used, the ellipsoidal marker 70 is difficult to distinguish from a circular marker because a cross section of the ellipsoidal marker 70 is circular in a case in which the major axis direction of the marker 70 and a moving direction of the ultrasound probe 10 are parallel to each other. In this case, since the number of frames of the ultrasound image U including the second marker image 76 is larger for the ellipsoidal marker 70 than for the spherical marker 70, it is possible to distinguish them by the number of frames of the ultrasound image U in which the second marker image 76 is detected.

In addition, for example, the size of the marker 70 may be applied as the second feature.

In addition, for example, as the second feature, the marker 70 may have a different brightness of the second marker image 76. Such a marker 70 can be obtained by varying the acoustic impedance depending on the type of the marker 70.

A plurality of types of the first features and a plurality of types of the second features may be combined.

Figure 18A:
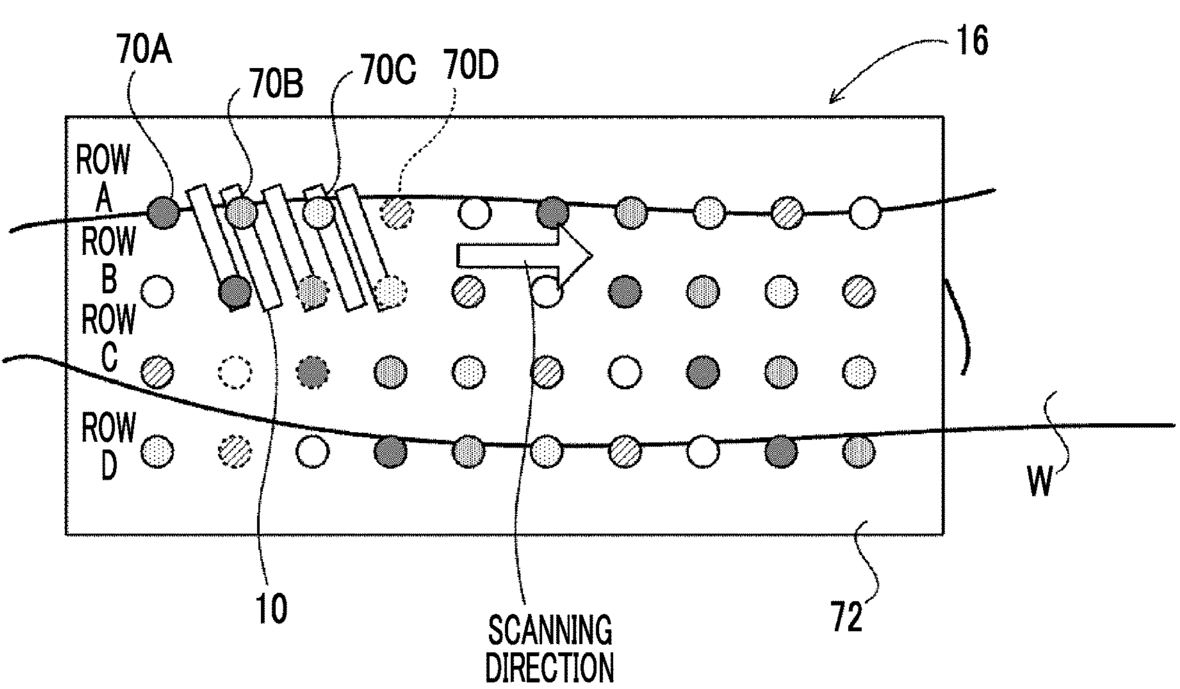
FIG. 18A is a diagram for describing another example of the method of performing the registration between the optical camera image and the ultrasound image.
Figure 18B:
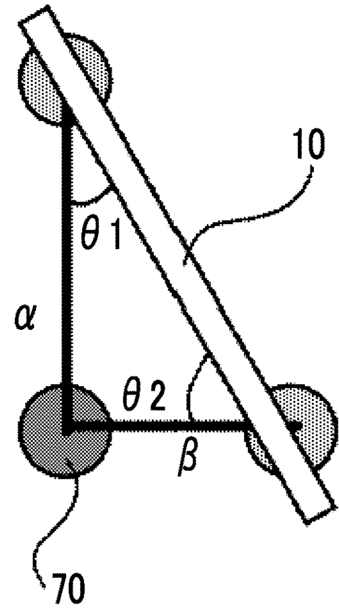
FIG. 18B is a diagram for describing the other example of the method of performing the registration between the optical camera image and the ultrasound image.

In addition, in the above-described example, it is preferable that the ultrasound image U includes the plurality of second marker images 76, but the ultrasound image U may include only one second marker image 76. In this case, for example, the registration unit 86 need only perform registration between the optical camera image P and the ultrasound image U as follows. A case in which the ultrasound image U is captured by moving the positioned ultrasound probe 10 in the scanning direction as shown in FIG. 18A will be described. As shown in FIG. 18B, an arrangement interval a between the markers 70 is known, and an interval R between the markers 70 in each row is also known. Therefore, an angle θ1 formed by the ultrasound probe 10 with respect to the arrangement interval a and an angle θ2 formed by the ultrasound probe 10 with respect to the interval R between the markers 70 can be derived from the arrangement interval a and the interval R between the markers 70.

In addition, for the arrangement interval a between the markers 70, a plurality of marker groups 16 having different intervals R may be prepared, and the marker group 16 corresponding to a width of the ultrasound probe 10 may be used.

In addition, the shape of the gel pad 72 in the marker group 16 may be a shape corresponding to the imaging part of the subject W.

A timing at which the image processing of step S16 shown in FIG. 11, that is, the processing of superimposing and displaying the image BP representing the blood vessel B on the optical camera image P is performed, and an apparatus that performs the processing are not limited to the above-described aspect. For example, the image processing may be performed during the capturing of the ultrasound image U (step S14 in FIG. 11). In addition, the image processing may be performed after the capturing of the ultrasound image U, for example, at a later date when a doctor or the like makes a diagnosis. In addition, the image processing may be performed by the ultrasound probe 10 or by an external device of the medical image capturing system 1.

In addition, in each of the above-described embodiments, the image generation unit 46 that generates the ultrasound image U based on the sound ray signal is provided in the main body portion 12, but instead of this, the image generation unit 46 may be provided in the ultrasound probe 10. In this case, the ultrasound probe 10 generates the ultrasound image U and outputs the ultrasound image U to the main body portion 12.

In addition, in the above-described aspect, for example, as a hardware structure of a processing unit that executes various types of processing such as the first acquisition unit 80, the first detection unit 81, the second acquisition unit 82, the second detection unit 83, the registration unit 86, the display controller 88, and the imaging controller 90, various processors shown below can be used. As described above, the various processors include, in addition to a central processing unit (CPU) which is a general-purpose processor that executes software (program) to function as various processing units, a programmable logic device (PLD) which is a processor whose circuit configuration can be changed after manufacturing such as a field programmable gate array (FPGA), and a dedicated circuitry which is a processor having a circuit configuration specifically designed to execute specific processing such as an application specific integrated circuit (ASIC).

One processing unit may be configured of one of the various processors, or configured of a combination of the same or different kinds of two or more processors (for example, a combination of a plurality of FPGAs or a combination of the CPU and the FPGA). In addition, a plurality of processing units may be configured of one processor.

As an example of configuring a plurality of processing units with one processor, first, there is a form in which, as typified by computers such as a client and a server, one processor is configured by combining one or more CPUs and software, and the processor functions as a plurality of processing units. Second, there is a form in which, as typified by a system on chip (SoC) and the like, a processor that implements functions of an entire system including a plurality of processing units with one integrated circuit (IC) chip is used. As described above, the various processing units are configured by using one or more of the various processors described above as a hardware structure.

Further, as the hardware structure of these various processors, more specifically, an electric circuit (circuitry) in which circuit elements such as semiconductor elements are combined can be used.

The image processing program 36 may be provided in an aspect in which the image processing program 36 is recorded in a recording medium, such as a compact disc read only memory (CD-ROM), a digital versatile disc read only memory (DVD-ROM), and a universal serial bus (USB) memory. In addition, the image processing program 36 may be downloaded from an external device via a network.

From the above description, the invention described in Appendices described below can be grasped.

APPENDIX 1

An image processing apparatus comprising: at least one processor, in which the processor acquires an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject, detects a region of interest from the ultrasound image of the subject, detects a first marker image representing the marker from the optical camera image of the subject, detects a second marker image representing the marker from the ultrasound image of the subject, and performs registration between the optical camera image of the subject and the ultrasound image of the subject based on the first feature of the first marker image and the second feature of the second marker image and displays an image representing the region of interest superimposed on the optical camera image of the subject.

APPENDIX 2

The image processing apparatus according to Appendix 1, in which the first feature is a feature corresponding to at least one of a color, a shape, or a size.

APPENDIX 3

The image processing apparatus according to Appendix 1 or Appendix 2, in which the second feature is a feature corresponding to at least one of a brightness, a depth of disposition, a shape, or a size.

APPENDIX 4

The image processing apparatus according to any one of Appendices 1 to 3, in which the region of interest is a blood vessel.

APPENDIX 5

The image processing apparatus according to any one of Appendices 1 to 4, in which the processor derives a position of a probe for scanning a surface of the subject and generating the ultrasound image, based on at least one of the first marker image or the second marker image, and outputs information indicating a warning in a case in which the position of the probe is other than a predetermined imaging position.

APPENDIX 6

The image processing apparatus according to Appendix 5, in which the plurality of markers are disposed in a plurality of rows, and in a case in which capturing of the ultrasound image of the subject is performed a plurality of times while imaging the plurality of rows in one time of scanning and shifting the rows, the predetermined imaging position is a position where a part of the plurality of rows previously imaged and a part of the plurality of rows currently imaged overlap.

APPENDIX 7

The image processing apparatus according to any one of Appendices 1 to 6, in which the processor outputs information indicating a warning in a case in which one second marker image is included in a plurality of the ultrasound images.

APPENDIX 8

The image processing apparatus according to any one of Appendices 1 to 6, in which the plurality of markers are disposed in a plurality of rows, and in a case in which capturing of a plurality of the ultrasound images is performed while imaging the plurality of rows in one time of scanning, and one second marker image is included in the ultrasound image of the subject, the processor estimates an angle of a probe with respect to the disposition of the marker based on a disposition interval of the plurality of markers, and performs registration between the optical camera image of the subject and the ultrasound image of the subject based on the estimated angle of the probe, the first feature of the first marker image, and the second feature of the second marker image.

APPENDIX 9

A system comprising: an ultrasonography apparatus; an optical camera; a plurality of markers; and the image processing apparatus according to any one of Appendices 1 to 8.

APPENDIX 10

An image processing method executed by a processor, the image processing method comprising: acquiring an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject; detecting a region of interest from the ultrasound image of the subject; detecting a first marker image representing the marker from the optical camera image of the subject; detecting a second marker image representing the marker from the ultrasound image of the subject; and performing registration between the optical camera image of the subject and the ultrasound image of the subject based on the first feature of the first marker image and the second feature of the second marker image and displaying an image representing the region of interest superimposed on the optical camera image of the subject.

APPENDIX 11

An image processing program causing a processor to execute a process comprising: acquiring an optical camera image of a subject captured by an optical camera and an ultrasound image of the subject captured by an ultrasonography apparatus in a state where a plurality of markers that have a first feature identifiable by the optical camera image and a second feature identifiable by the ultrasound image and that are distinguishable from other markers based on the first feature and the second feature are provided on the subject; detecting a region of interest from the ultrasound image of the subject; detecting a first marker image representing the marker from the optical camera image of the subject; detecting a second marker image representing the marker from the ultrasound image of the subject; and performing registration between the optical camera image of the subject and the ultrasound image of the subject based on the first feature of the first marker image and the second feature of the second marker image and displaying an image representing the region of interest superimposed on the optical camera image of the subject.

What is claimed is:

1. An image processing apparatus comprising:
at least one processor,
wherein the processor
acquires an optical camera image of a subject captured by an optical camera and an ultrasound image of the subject captured by an ultrasonography apparatus in a state where a plurality of markers are provided on the subject, each of the plurality of markers having a first feature identifiable by the optical camera image and a second feature identifiable by the ultrasound image, and being distinguishable from other markers based on the first feature and the second feature,
detects a region of interest from the ultrasound image of the subject,
detects a first marker image representing the marker from the optical camera image of the subject,
detects a second marker image representing the marker from the ultrasound image of the subject,
associates, based on marker feature information, which is a correspondence relationship between the first feature, the second feature, and a type of the marker, the first marker image and the second marker image such that the first marker image and the second marker image represent the same type of marker based on the first feature of the first marker image and the second feature of the second marker image, and performs registration between the optical camera image of the subject and the ultrasound image of the subject based on a positional relationship between the associated first marker image and the associated second marker image, and displays an image representing the region of interest superimposed on the optical camera image of the subject, wherein the plurality of markers includes a marker embedded in a gel-pad positioned on a surface of the subject, the first feature is a color of a surface of the marker in the optical camera image, and the second feature is a position, in a depth direction, of the marker in the ultrasound image, the position corresponding to a depth from a surface of the gel-pad to a center of the marker.

2. The image processing apparatus according to claim 1, wherein the region of interest is a blood vessel.

3. The image processing apparatus according to claim 1, wherein the processor derives a position of a probe for scanning the surface of the subject and generating the ultrasound image, based on at least one of the first marker image or the second marker image, and outputs information indicating a warning in a case in which the position of the probe is other than a predetermined imaging position.

4. The image processing apparatus according to claim 3, wherein the plurality of markers are disposed in a plurality of rows inside the gel-pad, and in a case in which capturing of the ultrasound image of the subject is performed a plurality of times while imaging the plurality of rows in one time of scanning and shifting the rows, the predetermined imaging position is a position where a part of the plurality of rows previously imaged and a part of the plurality of rows currently imaged overlap.

5. The image processing apparatus according to claim 1, wherein the processor outputs information indicating a warning in a case in which one second marker image is included in a plurality of the ultrasound images.

6. The image processing apparatus according to claim 1, wherein the plurality of markers are disposed in a plurality of rows inside the gel-pad, and in a case in which capturing of a plurality of the ultrasound images is performed while imaging the plurality of rows in one time of scanning, and one second marker image is included in the ultrasound image of the subject, the processor estimates an angle of a probe with respect to the disposition of the marker based on a disposition interval of the plurality of markers, and performs registration between the optical camera image of the subject and the ultrasound image of the subject based on the estimated angle of the probe, the first feature of the first marker image, and the second feature of the second marker image.

7. A system comprising:

an ultrasonography apparatus;

an optical camera;

a plurality of markers; and the image processing apparatus according to claim 1.

8. An image processing method executed by a processor, the image processing method comprising:

acquiring an optical camera image of a subject captured by an optical camera and an ultrasound image of the subject captured by an ultrasonography apparatus in a state where a plurality of markers are provided on the subject, each of the plurality of markers having a first feature identifiable by the optical camera image and a second feature identifiable by the ultrasound image, and being distinguishable from other markers based on the first feature and the second feature;

detecting a region of interest from the ultrasound image of the subject;

detecting a first marker image representing the marker from the optical camera image of the subject;

detecting a second marker image representing the marker from the ultrasound image of the subject;

associating, based on marker feature information, which is a correspondence relationship between the first feature, the second feature, and a type of the marker, the first marker image and the second marker image such that the first marker image and the second marker image represent the same type of marker based on the first feature of the first marker image and the second feature of the second marker image; and performing registration between the optical camera image of the subject and the ultrasound image of the subject based on a positional relationship between the associated first marker image and the associated second marker image and displaying an image representing the region of interest superimposed on the optical camera image of the subject, wherein the plurality of markers includes a marker embedded in a gel-pad positioned on a surface of the subject, the first feature is a color of a surface of the marker in the optical camera image, and the second feature is a position, in a depth direction, of the marker in the ultrasound image, the position corresponding to a depth from a surface of the gel-pad to a center of the marker.

9. A non-transitory computer-readable storage medium storing an image processing program causing a processor to execute a process comprising:

acquiring an optical camera image of a subject captured by an optical camera and an ultrasound image of the subject captured by an ultrasonography apparatus in a state where a plurality of markers are provided on the subject, each of the plurality of markers having a first feature identifiable by the optical camera image and a second feature identifiable by the ultrasound image, and being distinguishable from other markers based on the first feature and the second feature;

detecting a region of interest from the ultrasound image of the subject;

detecting a first marker image representing the marker from the optical camera image of the subject;

detecting a second marker image representing the marker from the ultrasound image of the subject;

associating, based on marker feature information, which is a correspondence relationship between the first feature, the second feature, and a type of the marker, the first marker image and the second marker image such that the first marker image and the second marker image represent the same type of marker based on the first feature of the first marker image and the second feature of the second marker image; and performing registration between the optical camera image of the subject and the ultrasound image of the subject based on a positional relationship between the associated first marker image and the associated second marker image and displaying an image representing the region of interest superimposed on the optical camera image of the subject, wherein the plurality of markers includes a marker embedded in a gel-pad positioned on a surface of the subject, the first feature is a color of a surface of the marker in the optical camera image, and the second feature is a position, in a depth direction, of the marker in the ultrasound image, the position corresponding to a depth from a surface of the gel-pad to a center of the marker.

* * * * *